A. FERNBACH.
PROTECTOR FOR BABY CARRIAGES AND THE LIKE.
APPLICATION FILED AUG. 30, 1916.
1,257,206. Patented Feb. 19, 1918.
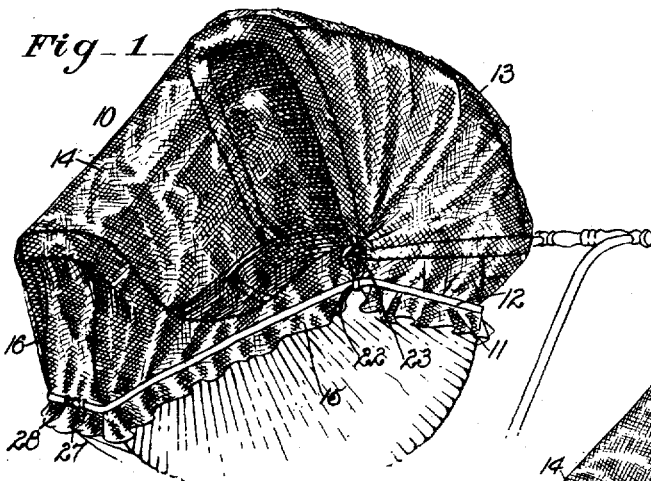
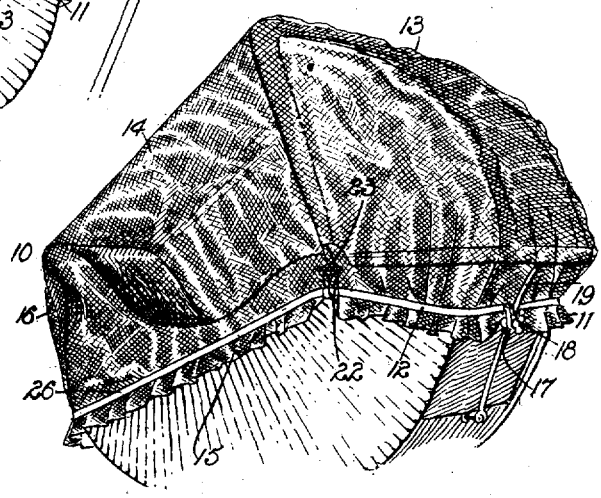
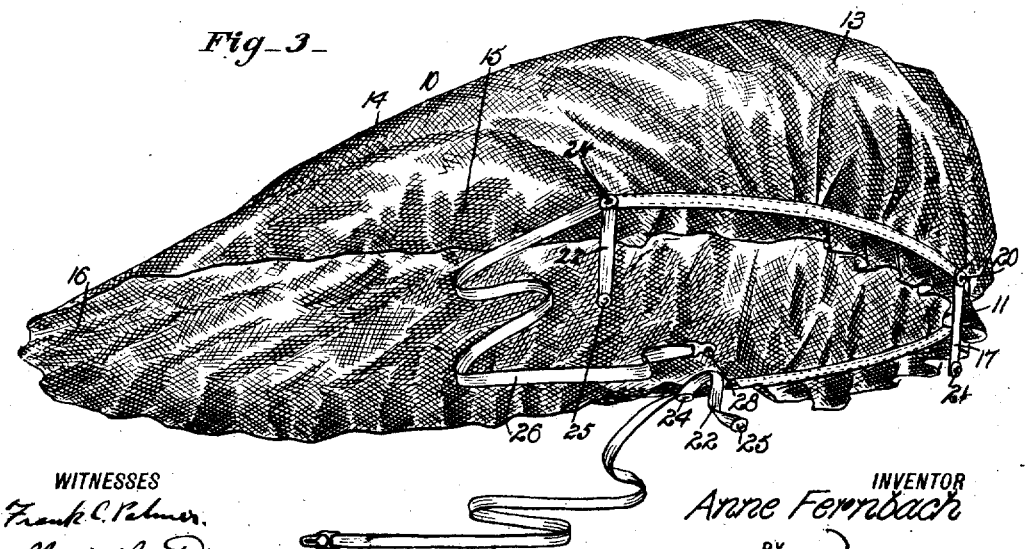
WITNESSES
Frank C. Palmer
Geo. F. Hostor
INVENTOR
Anne Fernbach
BY
ATTORNEYS

UNITED STATES PATENT OFFICE.

ANNE FERNBACH, OF NEW YORK, N. Y.

PROTECTOR FOR BABY-CARRIAGES AND THE LIKE.

1,257,206.   Specification of Letters Patent.   Patented Feb. 19, 1918.

Application filed August 30, 1916. Serial No. 117,654.

*To all whom it may concern:*

Be it known that I, ANNE FERNBACH, a citizen of the United States, and a resident of the city of New York, borough of Manhattan, in the county and State of New York, have invented a new and Improved Protector for Baby-Carriages and the like, of which the following is a full, clear, and exact description.

The object of the invention is to provide a new and improved protector for use on baby carriages, bassinets and the like, and arranged to permit of quickly and conveniently placing the protector in position and fastening it in place to protect the baby or infant against flies, mosquitos and other insects and also against the force of strong winds.

In order to produce the desired result, use is made of a piece of open mesh fabric, such as tarlatan, gauze, mosquito netting and the like, the piece of fabric having a short or gathered rear portion to form a hood from which extends a top portion and sides terminating in a front part, a rear attaching means for attaching the rear lower portion of the hood to the baby carriage, side attaching means for attaching the sides of the hood to the sides of the baby carriage, and side and front fastening means for holding the side portions of the piece of fabric in position against the sides of the baby carriage and for holding the front end of the fabric netting against the front of the baby carriage.

A practical embodiment of the invention is represented in the accompanying drawings forming a part of this specification, in which similar characters of reference indicate corresponding parts in all the views.

Figure 1 is a front perspective view of the protector as applied to a baby carriage;

Fig. 2 is a rear perspective view of the same; and

Fig. 3 is an enlarged perspective view of the protector.

The body 10 of the protector is formed of a piece of gauze, tarlatan, mosquito netting or similar open mesh textile fabric, and the rear portion of this piece of fabric is shirred or gathered, the lower end 11 thereof being attached to an inelastic tape 12 so as to provide a permanent hood 13 adapted to extend over the hood of the baby carriage, as plainly indicated in Figs. 1 and 2. The fabric material extends from the top of the hood 13 forwardly to provide a top 14, and the fabric material also extends forwardly from the sides of the hood to provide the sides 15. The top 14 and the sides 15 terminate in a front portion 16 reaching onto the front of the baby carriage, as plainly indicated in Figs. 1 and 2. The sides 15 extend onto the sides of the baby carriage so that the open top portion of the baby carriage is completely inclosed by the body 10 to prevent flies, mosquitos and other insects from reaching the baby or infant in the baby carriage.

In order to hold the protector securely in place on the baby carriage the following arrangement is made: To the middle of the tape 12 is secured a strap 17 adapted to be looped around the fastening device 18 for the rod 19 of the converting device of the baby carriage. The strap 17 is provided with fastening members 20 and 21 in the form of a socket and stud to fasten the ends of the strap together after the same have been looped around the fastening device 18. The ends of the tape 12 are provided with straps 22 adapted to be looped around the pivots 23 on which swings the hood of the baby carriage and which serve also to hold the hood of the baby carriage in extended position. Each of the straps 22 is provided at its ends with fastening members 24 and 25 in the form of a socket and stud, to fasten the ends of the straps 22 together after the same have been looped around the pivots 23. From the ends of the tape 12 extend forwardly elastic bands 26 adapted to pass over the sides 15 of the protector to hold the said sides against the sides of the baby carriage, and the ends of the bands 26 are provided with connecting members 27 and 28 adapted to be engaged with each other at the front 16 of the body 10 of the protector, thus holding the front 16 firmly against the front end of the baby carriage.

From the foregoing it will be seen that by the arrangement described the protector can be readily placed in position on the baby carriage and securely fastened thereon by the use of the straps 17 and 22 and the elastic bands 26. When it is desired to gain access to the baby or infant in the carriage it is only necessary to disconnect the connecting members 27 and 28 to allow the bands 26 to hang loosely down at the sides of the baby carriage to permit lifting the front 16 of the sides 15 and the top 14 onto the hood 13 to thus gain access to the interior of the baby carriage. It will be noticed that by this arrangement it is not necessary to detach the hood 13 from the baby carriage whenever access is desired to the interior of the baby carriage. Likewise after the baby has been attended to, the top 14, the sides 15 and the front 16 can be returned to their normal position and fastened in place by the bands 26. It is understood that by having the bands 26 elastic they firmly clamp the sides 15 and the front 16 in position against the sides and front of the baby carriage so that wind or the like is not liable to blow the protector into open position.

The protector shown and described is very simple in construction, can be cheaply manufactured and readily applied to a baby carriage, bassinet and the like.

Having thus described my invention, I claim as new and desire to secure by Letters Patent:

1. A protector for baby carriages and the like, comprising a body made of a piece of fabric netting and having a shirred rear portion to form a hood, a top portion, sides and front, an inelastic tape to which the lower edge of the said shirred portion is attached, rear attaching means attached to the tape at the middle thereof for engagement with the back of the baby carriage, side attaching means attached to the ends of the tape for engagement with the sides of the baby carriage, and elastic bands attached to the ends of the said tape and extending forwardly over the side portions and the front of the fabric netting and fastening means for connecting the front ends of the said bands with each other at the front end of the carriage.

2. A protector for baby carriages and the like, comprising a body formed of a piece of fabric netting having a shirred rear portion forming a hood, and a securing tape adapted to surround the edge of the said body and consisting of an inelastic rear portion secured throughout its length to the shirred rear portion of the body, and freely extending forward elastic portions having attaching means at their forward ends and connected at their rear ends to the forward ends of said inelastic portion.

ANNE FERNBACH.

Copies of this patent may be obtained for five cents each, by addressing the "Commissioner of Patents, Washington, D. C."